United States Patent
Ouyang

(10) Patent No.: US 10,747,792 B2
(45) Date of Patent: Aug. 18, 2020

(54) STREAMING EVENTS ANALYSIS FOR SEARCH RECALL IMPROVEMENTS

(71) Applicant: BBY SOLUTIONS, INC., Richfield, MN (US)

(72) Inventor: Dong Ouyang, Edina, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 337 days.

(21) Appl. No.: 15/827,507

(22) Filed: Nov. 30, 2017

(65) Prior Publication Data
US 2019/0163809 A1 May 30, 2019

(51) Int. Cl.
| | | |
|---|---|---|
| G06F 16/00 | (2019.01) | |
| G06F 16/332 | (2019.01) | |
| G06Q 30/02 | (2012.01) | |
| G06F 16/951 | (2019.01) | |
| G06F 40/247 | (2020.01) | |

(52) U.S. Cl.
CPC ...... *G06F 16/3325* (2019.01); *G06F 16/3322* (2019.01); *G06F 16/951* (2019.01); *G06F 40/247* (2020.01); *G06Q 30/0256* (2013.01)

(58) Field of Classification Search
CPC ............. G06F 16/3325; G06F 16/3322; G06F 16/951; G06F 17/2795; G06Q 30/0256
USPC .......................................................... 707/706
See application file for complete search history.

(56) References Cited

U.S. PATENT DOCUMENTS

| | | | |
|---|---|---|---|
| 7,599,930 B1 | 10/2009 | Burns et al. | |
| 2005/0289168 A1 | 12/2005 | Green et al. | |
| 2007/0271580 A1* | 11/2007 | Tischer | H04H 60/07 725/35 |
| 2008/0103971 A1 | 5/2008 | Lukose et al. | |
| 2011/0320441 A1* | 12/2011 | Lee | G06F 16/9535 707/723 |
| 2012/0016873 A1* | 1/2012 | Mathieson | G06F 16/24578 707/727 |
| 2012/0036123 A1 | 2/2012 | Hasan et al. | |
| 2015/0088845 A1 | 3/2015 | Zhao et al. | |

(Continued)

OTHER PUBLICATIONS

"Deconstructing E-Commerce Search: The 12 Query Types", Baymard Institute, (Jun. 18, 2014), 28 pgs.

*Primary Examiner* — Monica M Pyo
(74) *Attorney, Agent, or Firm* — Schwegman Lundberg & Woessner, P.A.

(57) ABSTRACT

Techniques and system configurations for identifying search recall activities and performing changes to search criteria based on streaming event data are disclosed. In an example, electronic operations used for identifying search recall scenarios based on streaming events in a user interface include: obtaining a plurality of streaming events that represent user interaction from a user interface sessions, from inputs that are used to locate and select items; identifying search recall scenarios from the events based on vicinity and exposure, where the items are not retrieved by initial searches; determining changes to selection criteria, to locate and select the items; and updating the selection criteria such that subsequent searches are configured to locate the items using the updated search criteria. With this technique, search data and rules such as exclusion and inclusion lists or category/product information rules may be automatically updated to successfully locate product items in subsequent searches.

25 Claims, 10 Drawing Sheets

(56) References Cited

U.S. PATENT DOCUMENTS

2016/0092520 A1    3/2016  Srivastava et al.
2016/0335270 A1*  11/2016  Garg ...................... H04L 67/10
2016/0378770 A1   12/2016  Tholiya et al.

* cited by examiner

| Initial Term Search: "smartphone hands free bluetooth" 610 | Event 1: User conducts free text search for "smartphone hands free bluetooth" from main commerce navigation page<br>Event 2: User receives search results, which primarily list bluetooth hands free device kits for smartphones<br>Event 3: User selects "Brand Y Smartphone" ad included on search results page<br>Event 4: User provides input to configure "Model X" of "Brand Y Smartphone" 620<br>Event 5: User adds "Brand Y Smartphone (Model X)" to cart<br>Event 6: User purchases Smartphone from cart | Search Recall Scenario 1 630 |
|---|---|---|
| Initial Term Search: "wireless blue teeth head phones" 640 | Event 1: User conducts free text search for "hands free blue teeth head phones" from main commerce navigation page<br>Event 2: User receives search results, which include "No results directly match the search query" but a listing of headphones, bluetooth devices, and other matches under a "Did you intend to search for." heading<br>Event 3: User navigates to and selects "ACME Wireless Headphones"<br>Event 4: User navigates to and selects "BlueCo Wireless Headphones" advertised on product display page of "ACME Wireless Headphones" 650<br>Event 5: User adds "BlueCo Wireless Headphones" to cart | Search Recall Scenario 2 660 |
| Initial Category Selection: "Smartphone Accessories" 670 | Event 1: User selects "Smartphone Accessories" category<br>Event 2: User navigates to second page of search results<br>Event 3: User selects "ACME Handsfree Headset" located in search results<br>Event 4: User navigates to and selects "BlueCo Wireless Headphones" advertised on product display page of "ACME Handsfree Headset"<br>Event 6: User navigates to "Headphones" category indicated on product display page of "BlueCo Wireless Headphones" 680<br>Event 7: User adds "BlueCo Wireless Headphones" to cart | Search Recall Scenario 3 690 |

*FIG. 6*

STREAMING EVENTS ANALYSIS FOR SEARCH RECALL IMPROVEMENTS

TECHNICAL FIELD

Embodiments discussed herein generally relate to data processing techniques performed on streaming interaction activities within electronic computing and communication systems. Certain embodiments discussed herein relate to processing client interaction event data and adjusting rules and parameters used in the searches of information systems and search result outputs provided by generated graphical user interface outputs.

BACKGROUND

A number of electronic systems are commonly used to coordinate the offer and sale of products or services, and the display of information for such products or services, in electronic commerce settings. Many types of electronic user interfaces are provided to consumers for accessing electronic commerce information via electronic platforms such as kiosks, smart devices, websites, or mobile apps. For instance, consumers commonly utilize user interfaces on such platforms to identify products and services, obtain information (e.g., location, cost, specifications) on specific products and services, and to make and manage electronic purchases of such products and services.

The shopping and information gathering activity performed in such user interfaces that leads to product and service purchases may involve multiple user activities and inputs within the user interface. Such activities and inputs may include user actions to select hyperlinked content, enter and refine search queries, navigate among different product or service descriptions and categorizations, and designate or enter purchase information or actions for a selected product or service.

A variety of rules and processes are utilized by existing user interfaces and information systems to generate or improve search results in e-commerce settings. Such rules and processes may include word misspelling/synonym lists, term or phrase-to-category mappings and exclusions, and other forms of predefined data and logic. Many existing approaches are applied in e-commerce settings to generate or improve search results by incorporating these rules and other human-reviewed or human-intervening approaches. However, these approaches are often inaccurate, incomplete, or outdated when applied to a large catalog of information, and as a result, many e-commerce user interfaces end up providing incomplete or irrelevant information. This results in the use of additional computer and network resources to locate relevant information and to fulfill consumer purchasing activity.

BRIEF DESCRIPTION OF THE DRAWINGS

FIG. 6 illustrates search and activity events being generated within respective search recall scenarios, according to an example described herein.

DETAILED DESCRIPTION

Figure 1:
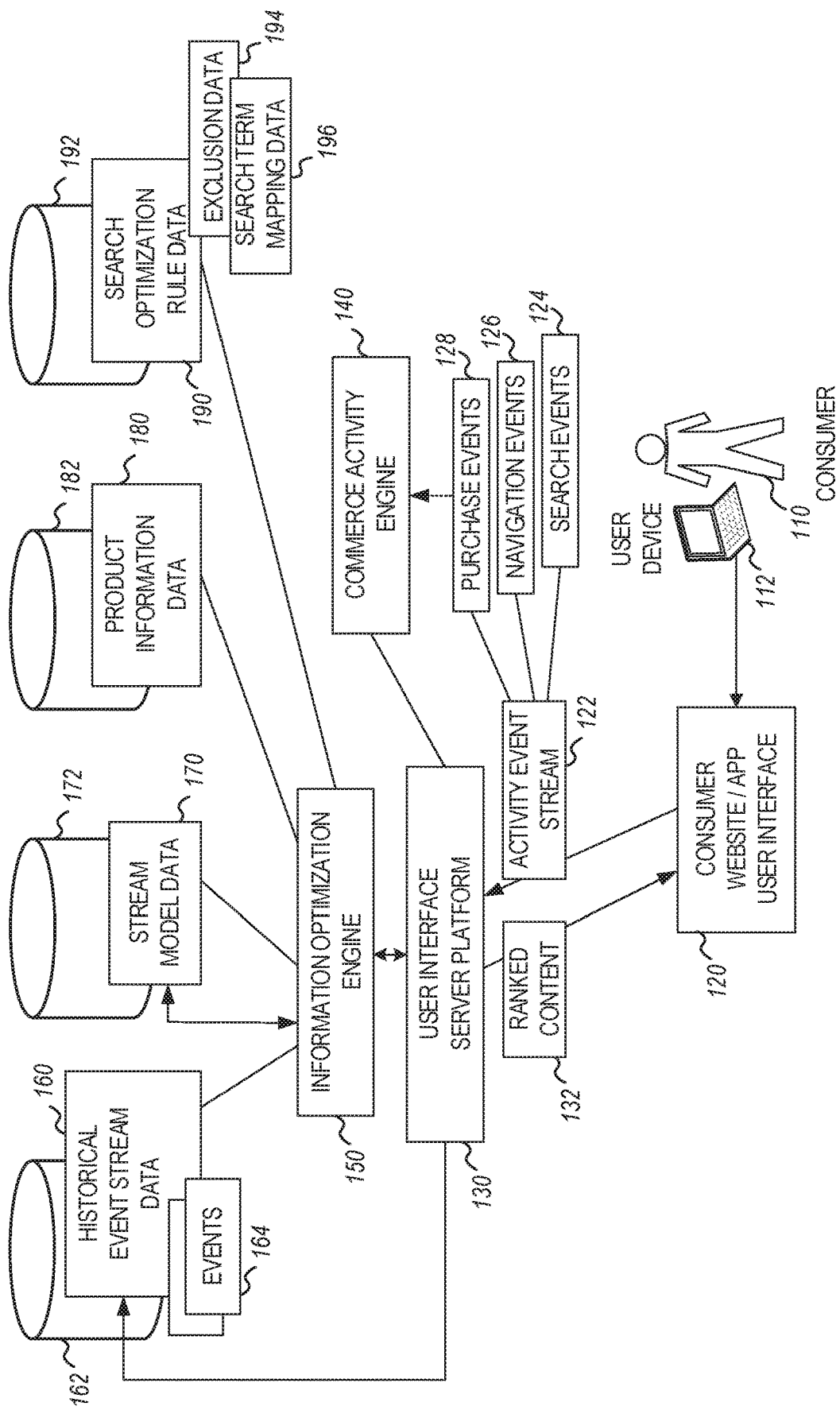
FIG. 1 illustrates an overview of systems involved in generation and use of a consumer searching user interface within an electronic commerce system, according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to techniques and configurations of computing systems that provide improved user interfaces and data processing techniques based on information search improvements determined from historical and current session event data. As discussed herein, various types of historical streaming events received within a consumer-operated user interface platform, such as a website or software app, may be identified, filtered, and processed, to change future search results and the extent of search engine recall. The resulting search result changes may improve the accuracy of the information retrieval activity, while also improving the speed and functionality of the user interface platform and associated data processing and network communication transactions.

In an example, a collection of streaming events is obtained from a commerce-based user interface, and this collection of streaming events is filtered to determine scenarios in which search precision or search recall did not result in a desired activity (specifically, manual customer navigation rather than a search query resulted in a purchase or attempted purchase of an item). From this filtered list of scenarios, various changes to search logic and rules may be identified and implemented within the commerce-based user interface. The changes to the search logic and rules may include product rule changes; word-to-synonym inclusion list changes; or word-to-category exclusion list changes.

As used herein, search "recall" generally refers to the amount or rate at which all relevant items are correctly identified; this is contrasted with search "precision" which generally refers to the amount or rate at which identified items are relevant. Specifically, the features discussed herein attempt to identify scenarios to improve search recall, such as in a scenario where a customer makes a purchase of a particular item even though the item was not identified in a search query made by the customer; improvements to search recall may be designed so that subsequent re-use of the search query will include the particular item in the search results. (However, in some cases, use of the present techniques may also have the benefit of improving search precision).

Various references to "engagement", "exposure", "relevancy", and "vicinity" are also included in the present disclosure. As used herein, "engagement" generally refers to an amount, level, or type of activity received in a user interface (e.g., by a customer) to perform interactive actions with information (e.g., searching information items, navigating and browsing to particular items, performing actions such as selection or purchase of particular items, etc.). As also used, "exposure" generally refers to the amount, level, or type of output occurring in the user interface (e.g., a set of customers is "exposed" to an information item in a search result a certain number of times, or an advertisement is displayed for an information item at a certain frequency). As also used, "relevancy" refers to an amount, level, or type of matching of characteristics relating to an information item (e.g., to match a search criteria, keyword, category, listing, or the like). As also used, "vicinity" refers to a relationship between a first, invoking activity provided in the user interface (e.g., a search query, or a selection of a particular category), and a second, resulting activity provided in the user interface (e.g., a purchase of a particular product as a result of the search query, or adding a product to an electronic shopping cart as a result of navigating to the particular category.) Thus, references to an "engagement score", "exposure score", "relevancy score", "vicinity score", and related factors incorporate the respective characteristics of such engagement, exposure, relevancy, and vicinity.

The following techniques focus on the selection and ordering of commerce information (e.g., product or service listings) within a commerce user interface, but it will be understood that these information ranking and processing techniques may also be applicable to other types of user interfaces and architectures. For instance, the following searching recall improvements may be implemented into other interfaces, architectures, or information systems not directly involving a sale of a product or service; the following searching recall improvements may also be incorporated with systems that do not directly involve the analysis of streaming events from electronic commerce websites or software apps.

The techniques discussed herein may be used to evaluate and adjust the performance of search rules and search models, based on customer engagement behavior that identifies incomplete or inaccurate search results. As a simple example, a product data change to incorporate a new keyword for a particular product may be identified if users repeatedly attempt to use the new keyword to locate the particular product; a synonym or alternate spelling of a new search word or phrase may be identified if consumers repeatedly utilize the synonym or alternate spelling in place of a known word; a new category may be presented or suggested in search results if consumers repeatedly look in an unexpected category for a particular product or product type. As further discussed, this data processing technique includes identifying these scenarios through the analysis of the "stream" of customer events occurring with an electronic commerce website or app, and the generation of information or rule changes based on a determined vicinity, exposure, and relevance of the customer event.

Prior approaches for analyzing search results and improving search recall in commerce user interfaces such as websites or apps often involved only basic (and typically manual) analysis of historical activity. For example, historical customer data of whether a purchase occurs (e.g., whether "conversion" has occurred) may be manually analyzed by a human administrator to determine whether a particular product or service should be presented to a consumer, or to determine top-ranking items in a consumer-entered search query or selected product category. Likewise, review of a number of customer search activities, such as misspelled search queries and keywords, may be manually analyzed by a human administrator to determine whether certain types of keywords are being spelled incorrectly. However, such data is typically analyzed independently from the consumer's overall commerce activity, and thus may not indicate that a consumer is intending to locate (and ultimately purchase) a certain product or product type while the search results are only produced and returned for a different product or product type.

In a similar manner, analysis of customer conversion data, to determine whether a customer actually purchased a product or service, is noisy and not precise, even as conversion data is often time-delayed and unpredictable. For instance, although conversion data may indicate that a consumer chose to purchase a particular product (or that a certain number of consumers chose to purchase the product), it will not explain what path or steps that the customer had to take to locate and purchase the particular product, and whether a number of other unhelpful products were provided and displayed before the particular product was selected. As a result, many forms of manual (human-based) adjustment and custom rules are employed in existing systems to prevent distorted search results or outcomes, and to manually invoke certain common outcomes.

In contrast, the techniques discussed herein may be used to identify new paths in which significant engagement occurred within a commerce user interface, to lead to reinforcement of search result terms and workflow paths that led (or would have led) to presentation of a more accurate set of information and engagement. Such changes may be dynamic in nature, and directly driven by the types and respective events of consumer activity. As a result, these changes may lead to improved search recall (and in some examples, improved search precision), and a more robust search interface. As discussed herein, these changes may be driven based on actual consumer activity determined from different types and levels of streaming events-allowing a measurement of consumer activity even if a conversion (e.g., a sale of a product or service) does not occur.

Finally, the techniques discussed herein provide a mechanism for updating and optimizing search and selection criteria over time, to provide improved displays of information over time. In this fashion, the resulting search criteria, rules, and models may be used to produce dynamic changes to engagement, exposure, vicinity, and categorization of information and information types. These and other technical benefits that increase information retrieval accuracy and improve delivery of information and data processing tasks (and the use of network and processing resources) will be apparent from these and other examples discussed herein.

FIG. 1 illustrates an overview of systems involved in generation and use of a consumer user interface within an electronic commerce system, according to an example described herein. As shown, a consumer 110 operates a consumer computing device 112 to access a consumer user interface 120. In an example, the consumer user interface 120 is a website or software application interface that is provided for facilitating electronic commerce. In the scenario of FIG. 1, the consumer 110 provides inputs to the user interface 120 to browse, navigate, and provide inputs while receiving and browsing information about products, services, and like aspects of electronic commerce offerings. An example arrangement of a consumer-facing e-commerce website is provided in FIG. 7 and further discussed below, and an example use scenario of the website for observing search recall is provided in FIG. 6.

The user interface 120 may be provided (e.g., distributed, hosted, or served) via a network on behalf of a business entity such as a retailer. The consumer 110 also uses the user interface 120 to select and purchase a particular product or service, within one or multiple sessions of the user interface 120. The user interface 120 may present various forms of data, in the form of text, graphics, and video, relating to the purchase or specification of one or more products or services. The user interface 120 may obtain this data from various data systems and data sources, such as on request from a user interface server platform 130 that is maintained by the business entity or an associated service provider.

As shown in FIG. 1, the user interface 120 exchanges data with the user interface server platform 130, through various inputs and outputs exchanged between the user interface and the platform. For example, the server platform 130 may operate as a data service provided within a web server or cloud-hosted app interface (e.g., application programming interface (API)), which exchanges requests and responses between the user interface and the platform. In an example, the server platform 130 operates to serve (e.g., obtain, host, or transmit) ranked content 132 to the user interface 120, based on an ordering or ranking of such content selected by a selection engine 150. The server platform 130 additionally provides the ranked content 132 in response to an activity event stream 122 that indicates various activities occurring in the user interface 120. In an example, the activity event stream 122 may be based on a current session of the user interface 120 as operated by the consumer 110 on the consumer computing device 112. In a further example, the activity events 122 may be based on other (e.g., previous, historical) sessions of the user interface 120 as operated by the consumer 110.

In a further example, the activity events 122 may be based on other sessions of the user interface 120 as operated by other users (e.g., consumers), including historical data or modeled data. For instance, historical events 164 from among multiple users may be stored in connection with a historical event stream data set 160 (e.g., stored in a data source 162). As the user interface server platform 130 captures and tracks an activity event stream 122 from the user interface 120 provided among multiple users and user devices, the historical event stream data set 160 may be updated with additional historical events 164.

In an example, the information optimization engine 150 is used to provide a selection and ordering of information obtained from a product information data set 180 (e.g., stored in a data source 182). As discussed with reference to FIG. 2, the information may be selected with use of a selection engine (e.g., the selection engine 210 shown in FIG. 2) based on the use of information selection algorithms (e.g., search algorithms) and rules. As also discussed with reference to FIG. 2, the information may be ordered based on characteristics of a ranking engine (e.g., the ranking engine 215 shown in FIG. 2) and aspects of streaming event models that are customized for a particular user, set of users, or interaction scenarios.

For instance, ordering, prioritization, categorization, and characterization of the selected information may be customized according to one or more streaming models provided from a stream model data set 170 (e.g., stored in a data source 172). The various stream models may provide various approaches for balancing of ranking information, and the ranking engine may update aspects (e.g., weights, factors, values) of the stream models based on various ranking methodologies. A further example of ranking and ordering based on a stream model, and related techniques to implement such ranking and ordering within a configuration similar to that depicted in FIG. 1, is further described in another patent application filed by the present inventor, Ser. No. 15/703,730, titled "STREAMING EVENTS MODELING FOR INFORMATION RANKING", and filed on Sep. 13, 2017, which is incorporated by reference herein in its entirety.

In an example, the selection engine may operate using selection data or selection rules that are produced from the historical event stream data set 160, as discussed with reference to the methodologies within FIGS. 3 to 5, as discussed below. The selection engine may obtain this data and selection rules from search optimization rule data set 190 (e.g., stored in a data store 192). In an example, the selection engine may utilize exclusion data 194 and search term mapping data 196 as part of the information search process, such as demonstrated within the examples of FIGS. 6 to 8, as discussed below.

Additionally, the selection engine may be triggered from current streaming events provided as part of the stream model data set 170. The selection engine also may coordinate the selection operations with features of the ranking engine. Other aspects of information selection and ranking may be implemented through use of the product information data set 180, the search optimization rule data set 190, or respective events of the search events 124, navigation events 126, purchase events 128, and the like.

The activity event stream 122 that is provided from the user interface 120 may include a variety of events initiated by the consumer 110, the consumer computing device 112, or other entities, such as search events 124 (e.g., from a user initiating a search to locate product or service information, based on one or more keywords or phrases); navigation events 126 (e.g., a user navigating between different pages or screens, such as by clicking on product or category links, selecting another screen, etc.); and purchase events 128 (e.g., a user performing an affirmative shopping activity such as adding a product to a shopping cart, confirming payment information to purchase an item, scheduling a service or delivery, or like commerce activities). Some of these events, such as the purchase events 128, may result in the generation of additional commerce events (e.g., product reservations, purchases) performed or facilitated with a commerce activity engine 140. Other forms and types of events may occur as part of the activity event stream 122.

In an example, multiple types of the events 124, 126, 128 may occur within a single user interface session. For instance, multiple purchase events 128 involving a product, accessories, and services are likely to occur in connection with a user interface workflow involving a purchase of a particular product (e.g., a home appliance such as a washing machine). This workflow may involve a user first searching for a product (e.g., searching for the keywords "washing machine" in a search term box), receiving a user interface presenting listings of multiple matching product entries, receiving a user selection of one or more of those product entries, receiving a selection of one or more of those product entries to a shopping cart, and continuing on to the entry of purchase information, confirmation of shipping and payment information, etc. As discussed herein, the combined events across a single user interface session or multiple events may be used to identify a deficiency in search recall; and likewise, used with the present techniques to improve aspects of the selection engine and the search optimization rule data set 190 (such as with changes to the exclusion data 194 and the search term mapping data 196).

With the present techniques, the search optimization rule data set 190, which affects the operation of the information optimization engine 150 and the output of the ranked content 132, may be dynamically changed based on the analysis of input and output events occurring in prior event streams. Thus, based on plurality of events 164 produced from the activity event stream 122 with sessions with the consumer 110 and many other users, search recall improvements may be implemented in an ongoing process.

Figure 2:
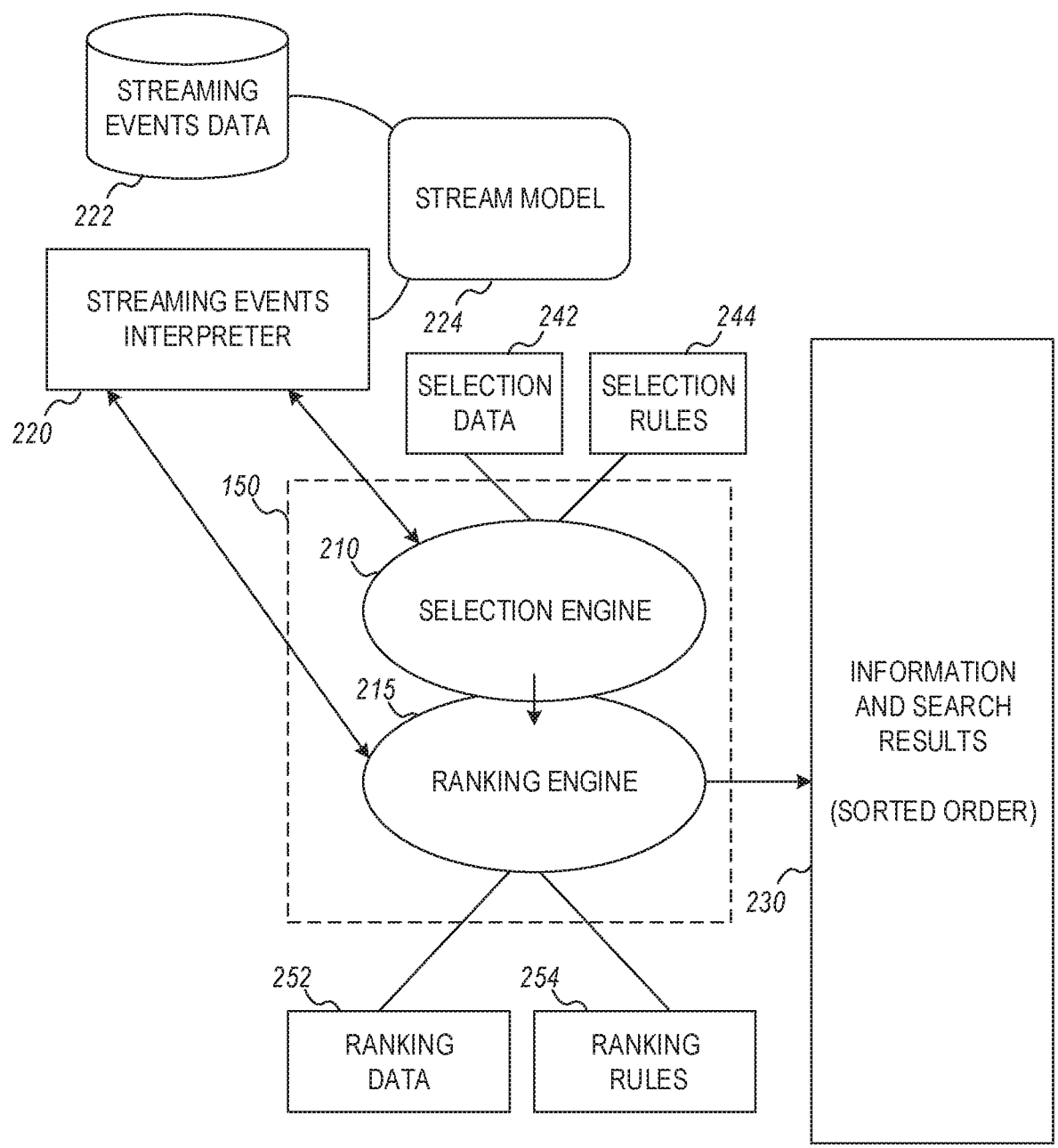
FIG. 2 illustrates an overview of an information search model utilizing streaming event search optimization techniques, according to an example described herein.

FIG. 2 illustrates an overview of an information ranking model utilizing streaming event search optimization techniques, according to an example described herein. As shown, the information optimization engine 150 includes a selection engine 210 and a ranking engine 215 used to select and rank respective information and search results 230. With the depicted search techniques, the streaming events may be used for both active search operations (e.g., to determine which particular items to provide in the information and search results 230) and historical training of the search flows (e.g., to modify the selection data 242, selection rules 244, ranking data 252, and ranking rules 254, used to operate the information optimization engine 150).

In an example, the selection engine 210 is adapted to identify and generate the output of information and search results 230, through the use of one or more selection data 242 and selection rules 244 data inputs. For instance, the selection engine 210 may apply the selection data 242 and selection rules 244 to include, exclude, or modify certain information results (e.g., information results corresponding to products or services) from a search engine, category listing, or other information source, based on streaming events evaluated with streaming events interpreter 220 (e.g., from an active user session). Historical streaming events from the data 222 provide a source of feedback and training for unexpected or unanticipated use cases encountered by the selection engine 210, as inclusion and exclusion characteristics of the selection data 242 and selection rules 244 are updated to improve search recall based on incomplete or inaccurate results or flows occurring from the streaming events.

Also in an example, the ranking engine 215 is adapted to generate an output of information and search results 230 in a sorted order, through use of one or more ranking data 252 and ranking rules 254. For instance, the ranking engine 215 may select and apply classifiers indicated by the ranking data 252 or the ranking rules 254, based on information inputs or streaming events evaluated with streaming events interpreter 220. In a similar manner, historical streaming events from the data 222 provide a source of feedback and training for cases encountered by the ranking engine 215, as the ranking data 252 and ranking rules 254 may be dynamically updated according to real-world behavior indicated by the streaming events from a plurality of users (e.g., based on exposure, engagement, and relevancy considerations).

In an example, the streaming events interpreter 220 operates to process current or historical streaming events data 222 captured within a user interface (e.g., user interface 120, discussed above). The streaming events may be further processed via a stream model 224 (e.g., provided by the stream model data set 170), which may filter, restrict, anonymize, emphasize, or de-emphasize particular streaming events. In further examples, the streaming events data 222 may be refined and maintained within additional models and stored in a data lake (not shown). In an example, streaming events captured from the user interface (e.g., user interface 120) may include: searches to retrieve a particular product, product type, product brand, or product characteristics; navigation or selection of a product or service; selection or comparison navigation to view additional information, product specifications, reviews, features, or the like; selection or other commands to add a product to cart, or to reserve or schedule a service; and selection or other commands to finance, reserve, or perform a purchase activity. These and like types of streaming events may be scored or weighted, to emphasize or de-emphasize certain types of events. In an example, initial events such as searches or navigation may receive a lower score; whereas more complex or sequential acts, such as the placement of a particular product into an electronic shopping cart, or a request to purchase the product, result in a higher score. Further discussion of the use of streaming events and the filtering of such events for purposes of search recall analysis is discussed below with reference to FIGS. 3 and 4.

The application of the selection data 242 and selection rules 244 within the ranking engine 150, to produce information and search results 230 for an information query, may utilize additional information inputs and rules directly not shown to adjust match or exclusion operations. For instance, specific examples of the selection rules 244 may include: product or category rules, used to emphasize or de-emphasize results of certain products or rules (e.g., as implemented with rule data discussed in FIGS. 3 to 5, below); specific examples of the selection data may include inclusion data (e.g., as discussed with a synonym list discussed in FIGS. 3 to 5, below), or exclusion data (e.g., as discussed with a term and category exclusion list discussed in FIGS. 3 to 5, below). In still further examples, other variations of searching and analysis models may be used to select or apply different types of selection and ranking models, based on user segmentation or other identified factors.

Figure 3:
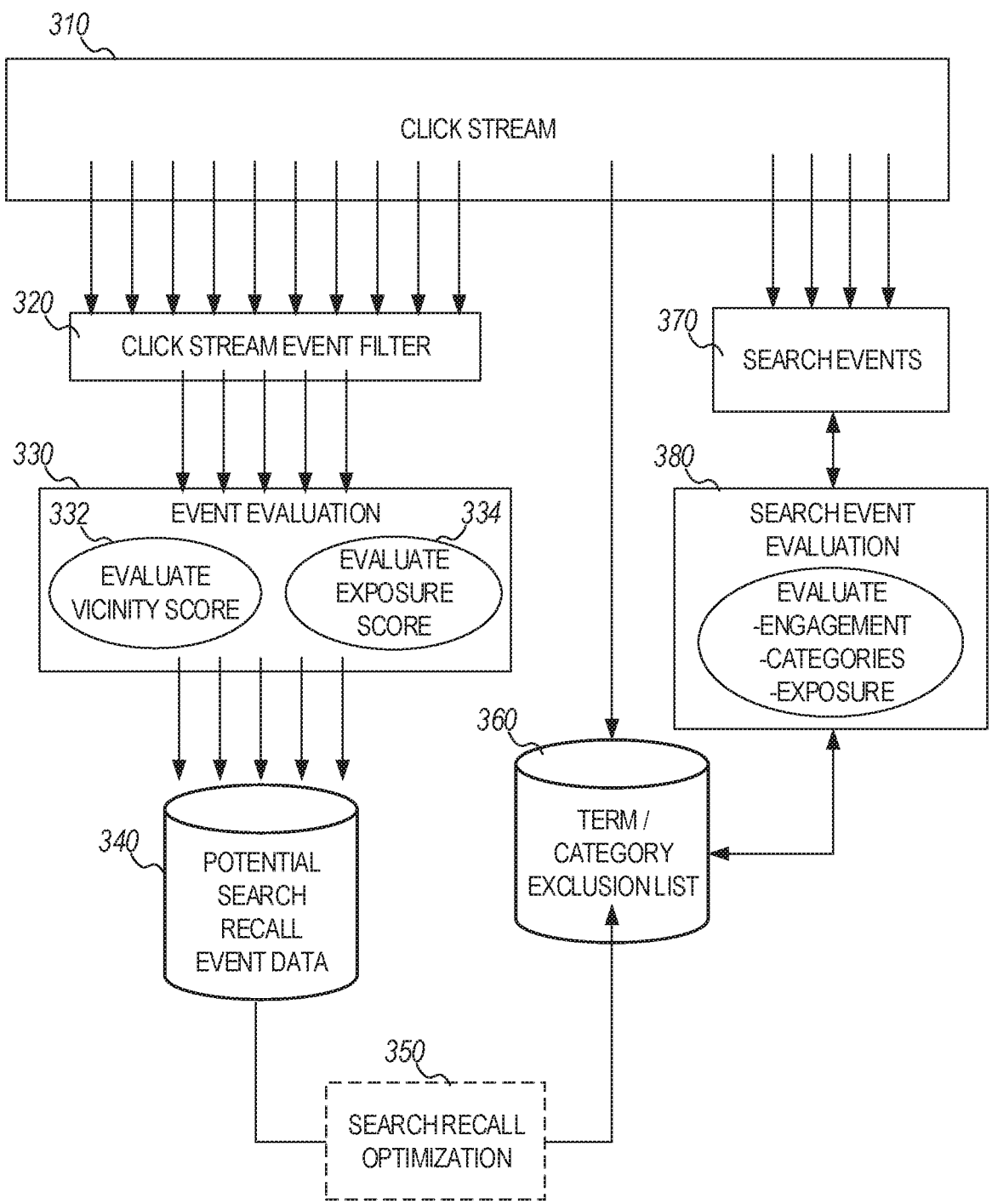
FIG. 3 illustrates a processing scenario for information events used to identify and utilize search recall events, according to an example described herein.

FIG. 3 illustrates a processing scenario for information events used to identify and utilize search recall events, according to an example described herein. Building on the examples discussed above, a click stream 310 of historical and current activity with respective stream events (e.g., produced from respective user "clicks" and UI interactions) may be used to evaluate search recall activities. In an example, the click stream 310 provides a plurality of event activities to a click stream event filter 320. This click stream 310 may provide results from a plurality of users among a plurality of sessions, over a large time period (e.g., days, weeks, months).

In an example, a set of historical events are reduced through use of the click stream event filter 320. For example, events in which no commerce activity (e.g., conversion, purchase, or attempted purchase) occurred may be excluded. Other forms of noisy or non-relevant data also may be separated using the filter 320. The filtered events are then provided into an event evaluation process 330, which attempts to analyze events from respective user interaction sessions.

In an example, the event evaluation process 330 analyzes commerce activity events from a particular session by the evaluation of a vicinity score 332. The vicinity score attempts to identify how closely a set of events are tied to one another. For example, user activity events that include a search followed by a small number of page navigations before a product is added to cart would have a high vicinity score; user activity events that include a search followed by an interruption in the session, or that include viewing of different types of products, would have a low vicinity score. In this fashion, the vicinity score provides a measurement of how strong is the tie between a search and a product that customer actually engaged with.

Also in an example, the event evaluation process 330 analyzes the commerce activity events from the particular session by the evaluation of an exposure score 334. The amount of exposure to a particular product that leads to a commerce activity may inversely indicate the importance between a search and a commerce activity. For example, a user activity event that produces a search having an obscure placement of an item (e.g., at the fourth page of a list of many ordered search results), followed by a selection and purchase of this item, would indicate that the commerce activity event happened despite low exposure to the item. In this fashion, the exposure score may provide a measurement of a confidence level for the relationship between a commerce activity and a user activity event.

Events which have a sufficiently strong vicinity score or exposure score (or a combination of these scores) may be further filtered and stored as potential search recall event data 340. This data 340 is provided to a search recall optimization process 350, such as the specific process sequences discussed with reference to FIGS. 4 and 5, below.

As a simple example, the search recall optimization process 350 may be used to generate or update a set of exclusion data 360, such as to remove entries from an exclusion list. For instance, if a certain term or category is being excluded from search results due to a pre-existing exclusion term (e.g., a common word that was believed to produce irrelevant results), but customers still attempt to locate products using that term, the search recall analysis may indicate that a term can be removed from the exclusion list.

In an example, a search event evaluation 380 is performed to evaluate the characteristics of the search events for search recall purposes, such as with the evaluation of engagement (e.g., to consider the type and amount of engagement with a particular product, in an identified search recall event stream), categories (e.g., to determine whether the user attempted to discover the particular product in another category during the search recall event stream), and exposure (e.g., to determine if the particular product was advertised a number of times in the search recall event stream). For instance, the evaluation may be used to exclude or disregard (or, alternatively, emphasize) some of the events in the search recall event stream.

In further examples, the updating of the exclusion data 360 and other forms of the selection data and selection rules may result in changes to subsequent search activity. For instance, subsequent search events 370 that are received from the click stream 310 may utilize the updated terms, categories, or list data provided in the set of exclusion data 360 (e.g., at query time). The subsequent search events 370 may also provide additional data for reinforcement of the search recall optimization process 350, the search event evaluation 380, or other aspects of the search recall processing.

Figure 4:
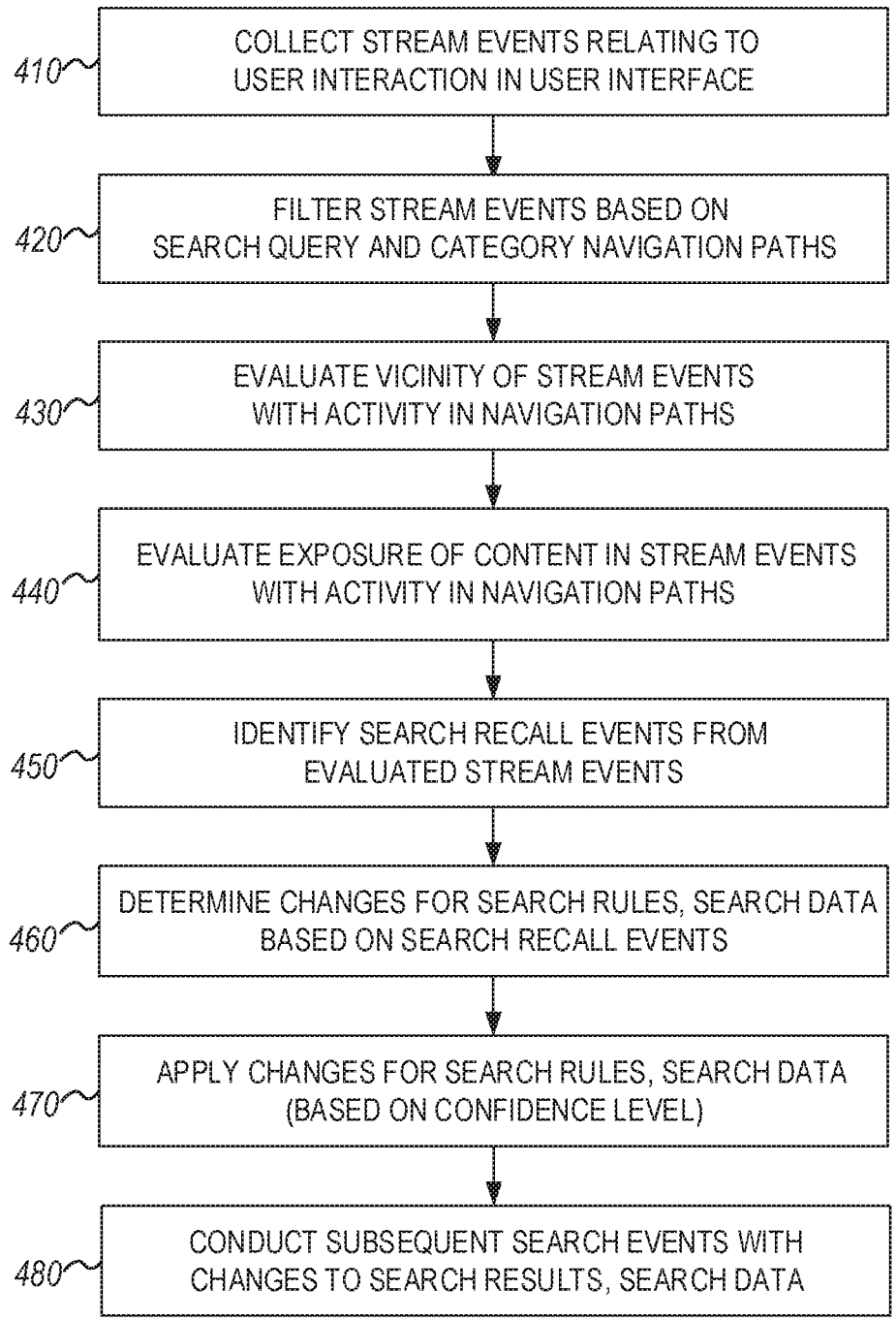
FIG. 4 illustrates a flowchart of a technique for capturing and processing searching activity for use within a search recall analysis, according to an example described herein.

FIG. 4 illustrates a flowchart 400 of an example technique for capturing and processing searching activity for use within a search recall analysis. The flowchart is depicted from the perspective of a data processing system, such as a data processing system including by a web server or software interface that receives and coordinates operations with a streaming event data store and a user interface processing system. However, it will be understood that the following techniques may be applicable among multiple types of systems, and within other types of user interaction settings.

The flowchart 400 specifically depicts a scenario for determining changes to search rules and search data based on stream events, such as in the stream events model depicted with reference to FIG. 3 above. As shown, the operations of the flowchart 400 commence with the collection of stream events from a plurality of user interaction sessions, as various users and sessions produce a variety of streams through navigation and activity within a user interface (operation 410). The streaming events of the user interface may be further processed to filter the stream events based on the type or content of search queries, the type or use of categories, or the navigation paths engaged with these search queries and categories (operation 420).

Further operations are performed on the filtered stream events to perform an evaluation of the type and significance of respective stream events. This evaluation may include evaluating a vicinity of commerce activity with stream events in the respective navigation paths (operation 430), and evaluating an exposure of content in the respective navigation paths that are associated with commerce activity (operation 440). Based on these scores and other metrics or modeling, a set of search recall events (e.g., events that indicate a search recall improvement scenario) may be identified from the evaluated stream events (operation 450).

Based on the vicinity and exposure scores (and other measurements that are related to a confidence level of a search recall scenario), various changes for search rules and search data may be determined (operation 460) and applied (operation 470). In an example, a confidence analysis may be performed to segment potential changes with a high or low (or intermediate) confidence, such as in a scenario where high confidence changes are automatically implemented, while low confidence changes are suggested to an administrator for review and manual implementation. The flowchart 400 finally concludes by conducting the subsequent search activity with use of the changed search rules and search data (operation 480), which produces a variation in the search results to include, exclude, or change the presentation of search results. The subsequent search events may utilize other searching, exclusion, inclusion, ranking, ordering, and grouping techniques for product and category listings and search queries as suggested in the examples discussed herein.

Figure 5:
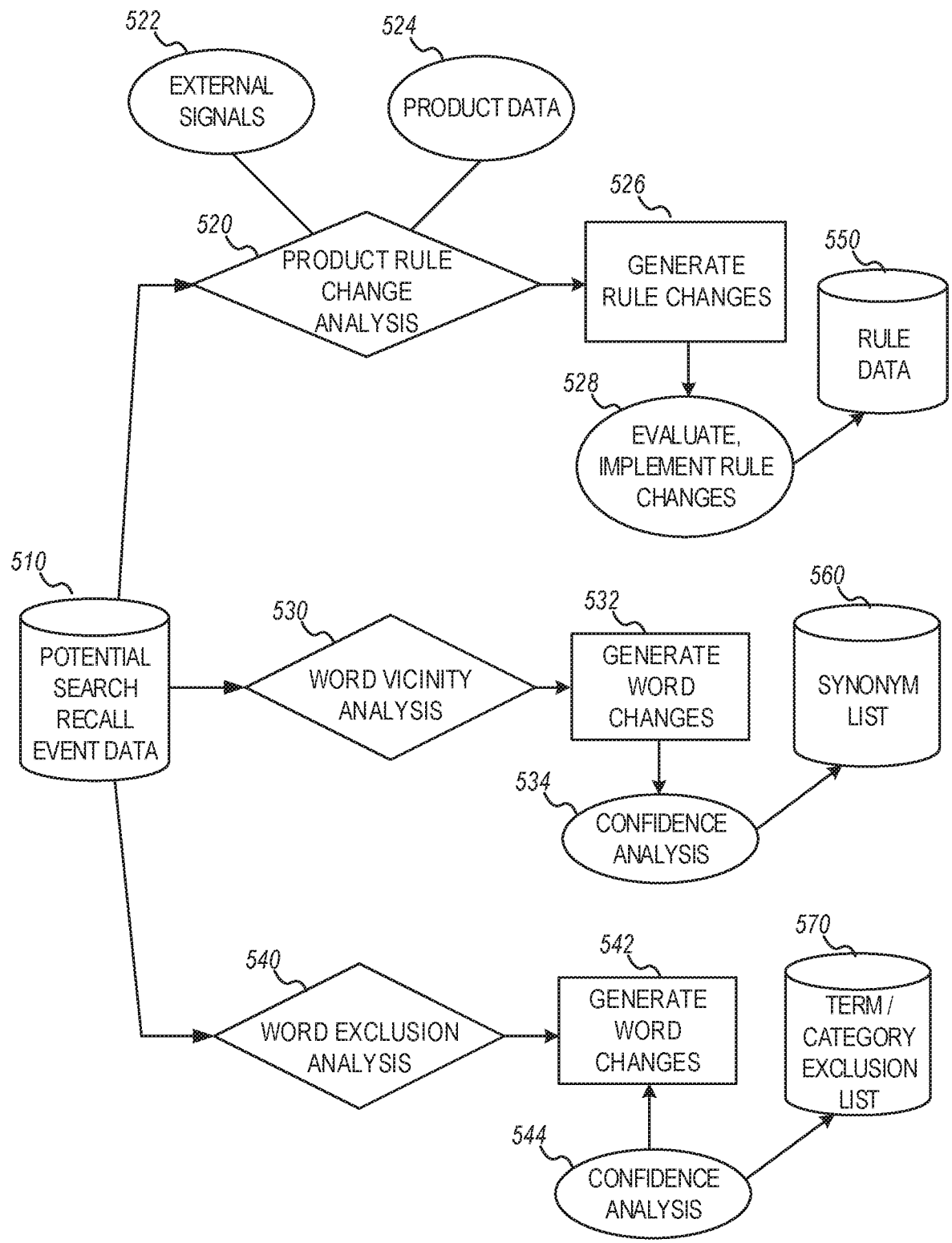
FIG. 5 illustrates a processing flow for implementing information selection changes based on search recall events, according to an example described herein.

FIG. 5 illustrates an example processing flow for implementing information selection changes based on search recall events. Specifically, the processing flow originating from a set of potential search recall event data 510 shows the result of three respective types of changes: a change to a product rule characteristic (e.g., implemented by product rule change analysis 520); a change to a word/synonym inclusion characteristic (e.g., implemented by word vicinity analysis 530); a change to a term/category exclusion characteristic (e.g., implemented by a word exclusion analysis 540). These are merely three examples of potential changes to search recall; it will be understood that other forms of analysis may also be conducted.

In an example, the product rule change analysis 520 may evaluate respective external signals 522 and product data 524 used by the search events, to generate a set of suggested rule changes 526. This analysis 520 may identify the reason why a particular product was not matched as a result of the search event, and what changes (e.g., additional metadata, product description keywords, etc.) could be added to cause the matching. This analysis may also determine whether some aspects (but not other aspects) were matched as a result of a rule or metadata value.

In an example, the suggested rule changes 526 from the product rule change analysis 520 may be machine-recommended (e.g., recommended as a result of an artificial intelligence algorithm), such as to identify a new or updated product category, feature data point, selection rule, keyword or term, or the like. These changes may be evaluated and implemented 528 as part of a human-monitored or human-influenced set of rule changes (e.g., to allow an administrator to review the rule changes or to revoke automatically-implemented rule changes). The resulting rule data 550 may be implemented for subsequent search activity.

In an example, the word vicinity analysis 530 may evaluate a search query or similar user interface selection activity indicated by search events. This analysis may generate a set of suggested word changes 532 for use in an inclusionary search selection data set. For instance, the analysis 530 may evaluate how close does a particular word or phrase match to a known word (e.g., whether 1 letter of 5, or 9 letter of 10, matches), whether the word is a known misspelling, whether it is a known synonym (e.g., the term "desktop" for "PC"), whether it includes a similar word pattern (e.g., a pattern as used by a manufacturer or brand), or whether it includes a phrase or a series of words associated with a particular term or terms.

In an example, the suggested word changes 532 (e.g., additional words) produced from the word vicinity analysis 530 may be automatically implemented as a result of a confidence analysis 534. For example, a high confidence of a word association may lead to an automatic addition to a synonym list 560; a low confidence of a word association may be discarded (or merely logged); and an intermediate confidence of a word association may be placed in a queue for review by an administrator. Similar techniques may be adapted to remove or update words from the synonym list 560.

In an example, the word exclusion analysis 540 may evaluate a search query or similar user interface selection activity indicated by search events. This analysis may generate a set of suggested word changes 542 for use in an exclusionary search selection data set. For instance, the analysis 540 may evaluate whether a product matches a brand or manufacturer keyword in a category or term exclusion list (e.g., this keyword may be included in an exclusion list because a manufacturer does not sell products in that category, or because the keyword frequently appears across many different products or categories and produces irrelevant results). However, if the brand or manufacturer begins to sell products in that category, or consumers repeatedly use the brand or manufacturer name to find products in that category, removal of this term from the exclusion list may be appropriate.

In an example, the suggested word changes 542 (e.g., that identify previously removed terms) from the word exclusion analysis 540 are automatically implemented as a result of a confidence analysis 544. For example, a high confidence of suitable search results with the term may lead to an automatic removal of a term from a term or category exclusion list 570; a low confidence of suitable search results may be discarded (or merely logged); and an intermediate confidence of suitable search results with the term may be placed in a queue for review by an administrator. Similar techniques may be adapted to add or update words from the term or category exclusion list 570. Other selection data lists and selection rules sets beyond those depicted in FIG. 5 may also be updated as a result of similar techniques.

FIG. 6 illustrates example search and activity events being generated within respective search recall scenarios 630, 660, 690. It will be understood that the following sequences are provided for purposes of illustration, and that other forms may also be utilized.

In an example, the first scenario 630 depicts a user interaction session where a user conducts a search 610 for the query "smartphone hands free Bluetooth". In this scenario, a rule is pre-configured to search for the phrase "hands free Bluetooth" in that particular order, while excluding the term "smartphone", which produces search results that primarily show Bluetooth hands free device kits and no smartphones. As shown in the list of events 620, however, the user intended to shop for a smartphone with hands free Bluetooth capabilities; this list of events shows the user ultimately making a purchase as a result of clicking on an advertisement from the search page. The events 620 from this scenario 630 may be analyzed by the search recall processing techniques discussed above (e.g., product rule change analysis 520), to change a search rule to not exclude the term "smartphone" from being considered in a search query.

In an example, the second scenario 660 depicts a user interaction session where a user conducts a search 640 for the query "wireless blue teeth head phones". In this scenario, there is no match for the term "blue teeth", as this is a misspelling of the term "bluetooth". As shown in the list of events 650, no search results are produced, but related search results that match "wireless headphones" are produced. Ultimately, the user views and purchases a set of wireless headphones that are Bluetooth wireless headphones, shown in the list of events 650. The events 650 from this scenario 660 may be analyzed by the search recall processing techniques discussed above (e.g., word vicinity analysis), to change a synonym list to include "blue teeth" to map to "Bluetooth".

In an example, the third scenario 690 depicts a user interaction session where a user conducts a category selection 670 under the query "Smartphone Accessories". However, an exclusion list associated with this category prevents the display of certain types of products, such as wireless headphones that are not associated with smartphones. However, in this scenario, the user navigates to a product display page linked on a second page of search results, and then navigates to another product advertised on the product display page, shown in the list of events 680. Ultimately, the user navigates to the "Headphones" category. The events 680 from this scenario 690 may be analyzed by the search recall processing techniques discussed above (e.g., word exclusion analysis), to update a term/category exclusion list to include a listing of Wireless Headphones when the "Smartphone Accessories" category is selected.

Figure 7:
FIG. 7 illustrates user interface functionality adapted to receive respective search and activity events used for analyzing search recall, according to an example described herein.

FIG. 7 illustrates functionality of an example user interface layout 700 adapted to receive respective search and activity events for analyzing search recall. Specifically, the user interface layout 700 is adapted to present and receive information and selection options for products or services in a webpage-based user interface, and receive commerce events as a result of sequential activities. As shown in FIG. 7, the user interface layout 700 provides an interface with a number of information selection and display options, specifically depicting search results 720 for a particular product type (as shown, a type of appliance matching a search term string). It will be understood that the example of the user interface layout 700 is not limited to the presentation of appliance products, as other types of products, product features, and accompanying services may also be presented or advertised.

The user interface layout 700 specifically depicts the listing of search results 710 in addition to sub-category selectors 710A and search options (710B-710F) to refine, limit, or invoke a subset of results. For instance, a consumer may choose to select one or more of the user interface checkboxes to expand or limit the search results 720. Visibility of additional search results may be provided through an affirmative selection of additional results (e.g., a "See More Results link 726), through scrolling or swiping, or through other forms of user interaction.

The information that is presented in the search results 720 may include basic or detailed information, including text and graphical information in a variety of forms. As shown, information presented for a first product may include a corresponding product link 722A, product summary information, pricing information, customer ratings, and the like; the information presented for a second product may include a corresponding second product link 722B, product information. Each of the search results may include a purchase selection option, such as respective "Add to Cart" buttons 728A, 728B for the respective products. In further examples, a user may conduct commerce activity as a result of navigating to the product display page, as the product display page may include other options to directly purchase, add to cart, reserve, add to a shopping list, etc.

As discussed with the techniques above, the activity conducted within the user interaction events in a user interface (such as the user interface 700) may produce streaming events that indicate search recall scenarios. For instance, the use of various types of commerce inputs with the search results 720 (e.g., clicking on a product link 722, selecting or interacting with the information, or invoking a purchase option such as "Add to Cart" 728) may be used to generate a stream of events that is used for later search recall analysis.

As shown, the query 705 entered by the user may product results that are not directly relevant to the search intended by the user. For instance, the example query "Clothes Machine Cleaner" may produce top-ranked results of washing machines (product links 722A, 722B, and related product link 724A), due to the prevalence of these keywords within the product display listings. However, in this example, the user intends to identify a "Washing Machine Residue Cleaner" product (product link 724B) used to clean a washing machine.

If the user ultimately arrives at and purchases the intended product (e.g., by navigating to the related product link 724B, or as a result of complex navigation through the website to discover this product), the intended product will be identified as the correct product to be captured in the search recall analysis. The various search recall analysis processes discussed above may be utilized to determine whether there are certain categories or terms that are being improperly excluded or included for the search query. Based on tuning from a search recall analysis process, subsequent uses of the search query in the user interface layout 700 may select and order the product links differently (e.g., to emphasize the product link 724B as a top result).

It will be understood that the user interface layout 700 is one example of a user interface output, as many other user interface screens relating to products, services, categories, and groupings of such products or services, and the like may be provided within a user interface. Accordingly, the type and presentation format of selected search results, and the search recall processing produced from the interaction of such search results, may be based on streaming events received among any of these user interface layouts or screens.

Figure 8:
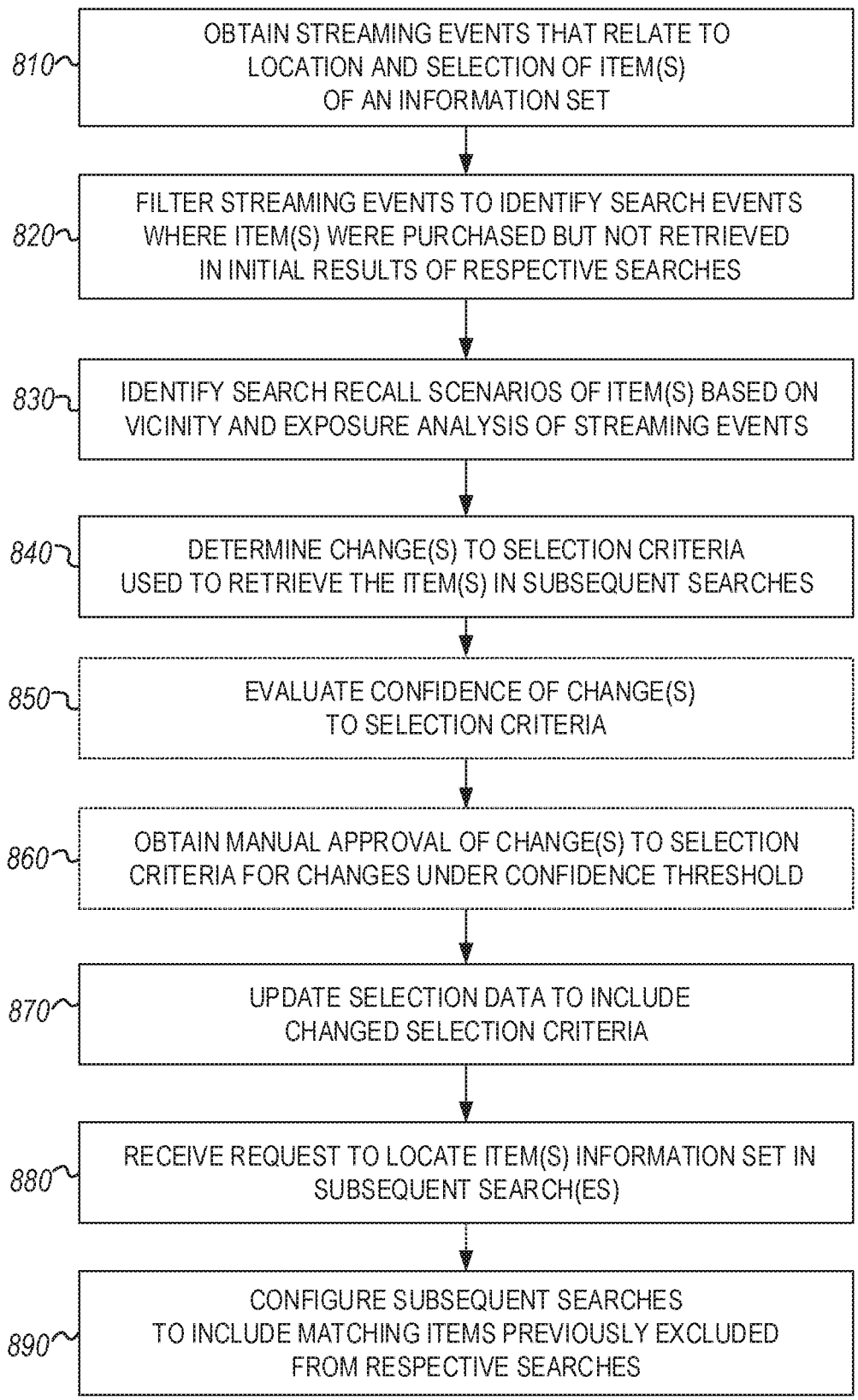
FIG. 8 illustrates a flowchart of a method for implementing search recall processing based on streaming events, according to an example described herein.

FIG. 8 illustrates a flowchart 800 of an example method for search recall processing based on streaming events according to an example described herein. It will be understood that the operations of the flowchart 800 may be implemented in connection with a computer-implemented method, instructions on a computer readable medium, or on a configuration of a computing device (or among multiple of such methods, products, or computing devices). In an example, the electronic operations are performed by a computing system that operates as a server to host and generate features of a client-accessible user interface (e.g., from a web server); in another example, the electronic operations are performed within aspects of distributed or client computing devices used to present the user interface.

As shown, the operations of the flowchart 800 may commence to include obtaining a plurality of streaming events that represent user interaction in a user interface, where the streaming events indicate inputs received within the user interface to locate and select items of an information set (operation 810). For instance, this information set may include a searchable product or service catalog or other information listing. The operations of the flowchart continue to filter the streaming events, to identify navigation activities and purchase activities of a particular item of the information set (operation 820). For instance, the search events may constitute events where one or more items were purchased but not retrieved in initial results of respective searches. In an example, the streaming events may be further filtered based on relevancy of the navigation activities and purchase activities to inputs received within the user interface to locate and select the particular item.

The operations of the flowchart 800 continue to identify search recall scenarios, based on vicinity and exposure analysis of streaming events (operation 830), such as determined using a vicinity score and an exposure score. For instance, these search recall scenarios may relate to scenarios that resulted in respective commerce activities with the items of the information set where the items of the information set were not retrieved by respective searches used to locate the items. In an example, the vicinity score used in the determination is based on inputs received in the user interface, such that the vicinity score of a respective set of streaming events relates to proximity of a commerce activity to a respective search in the respective set of streaming events. Also in an example, the exposure score used in the determination is based on outputs provided in the user interface, such that the exposure score of the respective set of streaming events relates to an amount of exposure of a particular item of the information set in the outputs provided by the user interface relative to the commerce activity.

The operations of the flowchart 800 also continue to determine, based on the identified search recall scenarios, one or more changes to a selection criteria that is used to locate the items with subsequent searches of the information set (operation 840). In an example, the selection criteria relates to a rule used to select a particular product from the information set, based on product information associated with a respective item of the information set, and determining the change to the selection criteria is performed based on an evaluation of one or more external signals and one or more product data fields associated with the respective item. Also in an example, the selection criteria relates to selection data provided from one or both of exclusion data or inclusion data, where the selection data is used within a search to retrieve matching items from the information set. For instance, this change may result in a change to exclusion data, where the exclusion data is provided from a category-term exclusion list, for a category-term exclusion list that is used to perform a search of the information set by excluding one or more categories based on one or more terms in a search query. Also for instance, this change may result in a change to inclusion data, where the inclusion data is provided from a synonym-term inclusion list, for a synonym-term inclusion list that is used to perform a search of the information set by including one or more synonyms of one or more terms in a search query.

In an optional example, the changes may be implemented as a result of evaluating a confidence of the changes to the selection criteria (operation 850), and obtaining an approval of changes to the selection criteria for changes that are under a confidence threshold (operation 860). In an example, as a result of identifying a confidence level of changes to the selection criteria, changes to the selection criteria of a high confidence are automatically implemented, changes to the selection criteria of an intermediate confidence are presented to an administrator for approval and implementation, and changes to the selection criteria of a low confidence are not implemented.

The changes are implemented by updating the selection data to include the changed selection criteria (operation 870). As a result, subsequent received requests are processed to locate one or more items of the information set in one or more subsequent searches (operation 880), and such subsequent searches may be configured to include matching items that were previously excluded from the search activity (operation 890). For instance, the subsequent requests that are received in the user interface may include a textual search query or a category selection, which use the changes to the selection criteria.

The example operations of flowchart 800 may be performed at or among concerted functions of a client or server computing device. In an example, the software application is adapted to execute on the server computing device with use of a processor and a memory device. In another example, the presentation functions of the software application are adapted to execute in an app or browser of a client computing device, such as through a communication session provided via a web server or a software application interface. The example operations of flowchart 800 may be performed through a system comprising a selection engine and an electronic user interface system, which is configured to identify and select data on behalf of an electronic commerce processing system. Other combinations and subsystems may be implemented with the operations of flowchart 800, such as illustrated with the following components in FIG. 9.

Figure 9:
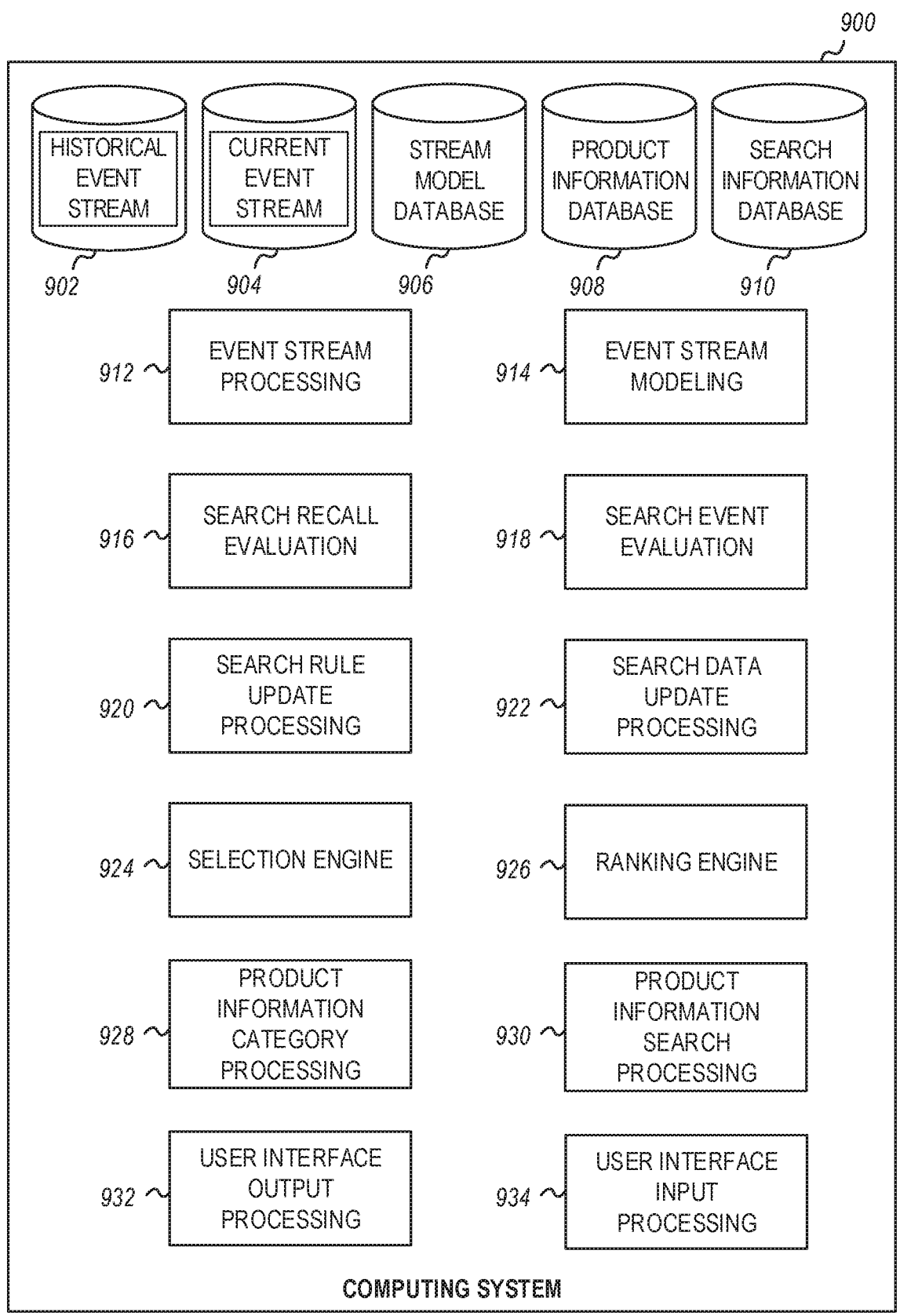
FIG. 9 illustrates a block diagram of processing and functionality components operable in a computing system implementing search recall processing based on streaming events, according to an example described herein.

FIG. 9 illustrates a block diagram of processing and functionality components operable in a computing system 900 implementing search recall processing, such as are accomplished with the examples described above. It will be understood, that although certain hardware and functional components are depicted in FIG. 9 and in other drawings as separate subsystems or services, the features of the subsystems or services may be integrated into a single system or service (e.g., in an application programming interface hosted by a server computing system). Further, although only one computing system is depicted, it will be understood that the features of these systems may be distributed among one or multiple computing systems (including in cloud-based processing settings).

As shown, the computing system 900 includes various functionality subsystems 912-934 used to perform search recall processing for user interface events and databases 902-910 to store information for the event stream information and to facilitate processing and collection of event stream data in connection with the search recall techniques discussed herein (e.g., discussed above for FIGS. 1-8). In an example, the computing system 900 is adapted to execute software applications that implement the functionality subsystems and databases, through software application processing components and functionality, such as circuitry and software instructions.

In an example, the computing system 900 includes data stores provided by a historical event stream 902, a current event stream 904, a stream model database 906, a product information database 908, and a search information database 910. These databases may store and implement data for the various information items, models, rules, and attributes for implementing search recall processing as discussed in the examples above.

In an example, the computing system 900 is adapted to implement respective features including: event stream processing or functionality 912 (e.g., circuitry or software instructions) used to capture, obtain, and extract data from respective user interface streaming events from within a user interface; event stream modeling 914 (e.g., circuitry or software instructions) used to create and update event stream models applied to analyze user interaction streaming events; search recall evaluation processing or functionality 916 (e.g., circuitry or software instructions) used to identify and evaluate search recall scenarios from user interaction streaming events; search event evaluation processing 918 (e.g., circuitry or software instructions) used to filter and score events from user interaction streaming events relevant to search recall scenarios (e.g., based on vicinity and exposure); search rule update processing or functionality 920 (e.g., circuitry or software instructions) used to identify and implement changes to search rules (e.g., used by search algorithms) that select information within the user interface; search data update processing or functionality 922 (e.g., circuitry or software instructions) used to identify and implement changes to search data (e.g., used by search algorithms) that select information within the user interface; selection engine processing or functionality 924 (e.g., circuitry or software instructions) used to select information and accomplish the search queries based on the search rules and the search data, to provide selected information within the user interface; ranking engine processing or functionality 926 (e.g., circuitry or software instructions) used to verify and adjust ranking, ordering, and grouping information of the search queries, to provide ranked search results within the user interface; product information category processing or functionality 928 (e.g., circuitry or software instructions) used to analyze and utilize product category information with inputs and outputs within the user interface; product information search processing or functionality 930 (e.g., circuitry or software instructions) used to facilitate a search of the information within the user interface; user interface output processing or functionality 932 (e.g., circuitry or software instructions) used to provide and analyze output characteristics of the information within the user interface; and user interface input processing or functionality 934 (e.g., circuitry or software instructions) used to provide and analyze input characteristics of the user interaction within the user interface. Other functional and processing aspects may be performed or structurally embodied by the computing system 900 to implement the techniques discussed above for FIGS. 1-8.)

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
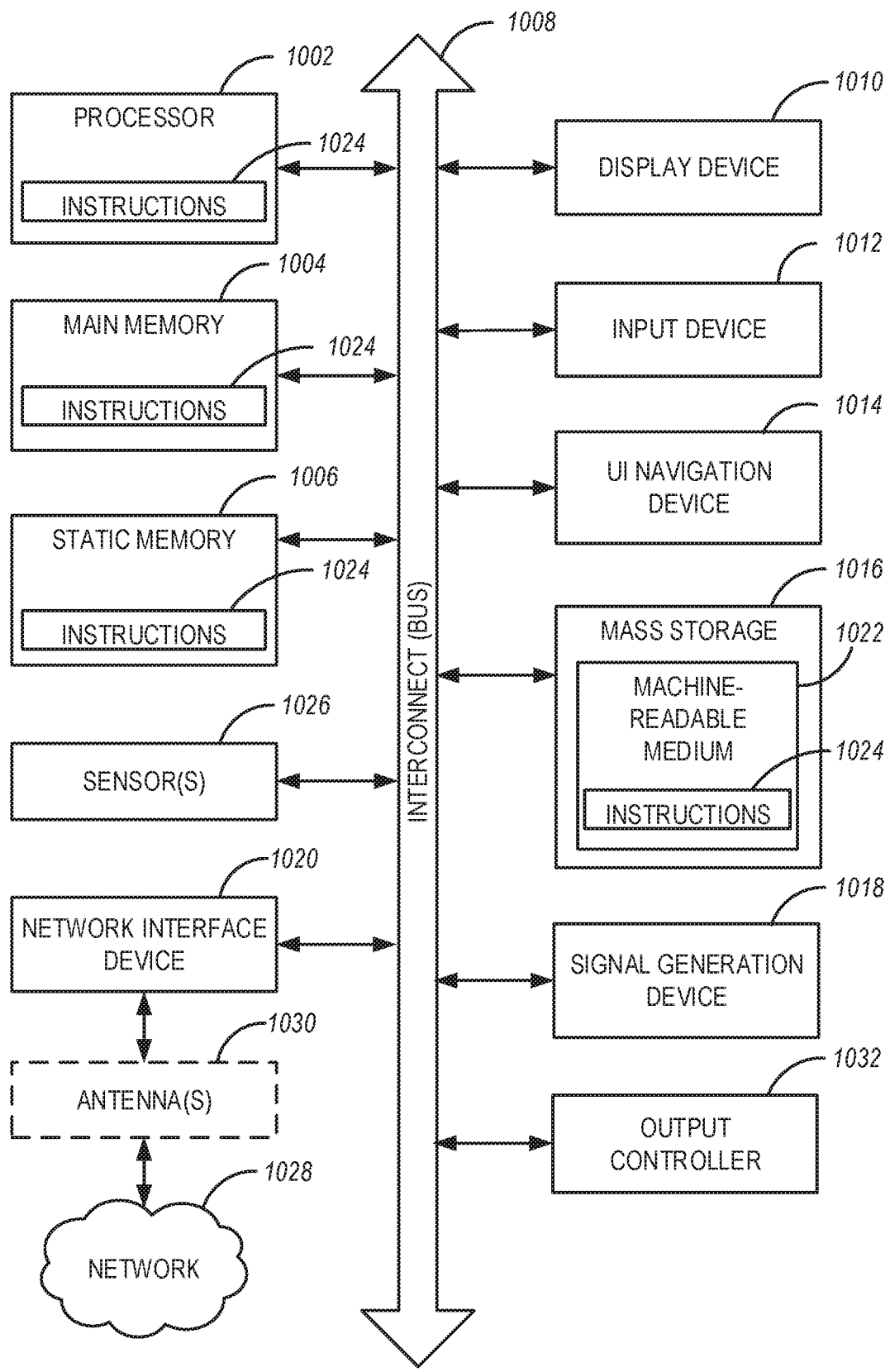
FIG. 10 illustrates a block diagram of operational components of a computing system upon which any one or more of the techniques herein discussed may be executed and implemented.

FIG. 10 illustrates a block diagram illustrating a machine in the example form of a computer system 1000, within which a set or sequence of instructions may be executed to cause the machine to perform any one of the methodologies discussed herein, according to an example. Computer system machine 1000 may be embodied by the computing system 900; the subsystem(s) implementing the data stores 902-910; the subsystem(s) implementing the various processing or functionality 912-934; the systems and engines 130, 140, 150, and interface 120; the consumer computing device 112; or any other electronic processing or computing platform described or referred to herein. Further, the computer system machine 1000 may embody instructions and data to perform any of the interfaces or functions referenced for FIGS. 1-9.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A computer system comprising:
   a processor; and
   memory coupled to the processor and storing instructions that, when executed by the processor, cause the computer system to perform operations comprising:
   obtaining a plurality of streaming events representing user interaction in a user interface, wherein the streaming events indicate inputs received within the user interface to locate and select items from an information set,
   identifying, from the streaming events, a plurality of search recall scenarios using a vicinity score and an exposure score for individual items of the information set, wherein the search recall scenarios result in respective commerce activities with the items of the information set, wherein the vicinity score relates to a proximity of a commerce activity to an attempted search for an individual item, wherein the exposure score relates to an amount of exposure of the individual item in the user interface before the commerce activity, and wherein the search recall scenarios occur when the items of the information set are not retrieved by attempted searches that utilize respective search terms in an attempt to locate the items;

determining, based on the identified search recall scenarios, a change to a selection criteria used to locate the items with subsequent searches of the information set that utilize the respective search terms; and updating, based on the change to the selection criteria, a data set to include the change to the selection criteria, wherein the subsequent searches of the information set are configured to locate the items of the information set using the changed selection criteria.

2. The computer system of claim 1,
wherein the selection criteria relates to a rule used to select a particular product from the information set, based on product information associated with a respective product item of the information set; and
wherein determining the change to the selection criteria is performed based on an evaluation of one or more external signals and one or more product data fields associated with the respective product item.

3. The computer system of claim 1,
wherein the selection criteria relates to selection data provided from one or both of exclusion data or inclusion data, and wherein the selection data is used within a search to retrieve matching items from the information set.

4. The computer system of claim 3,
wherein the selection data is provided by exclusion data, wherein the exclusion data is provided from a category-term exclusion list, and wherein the category-term exclusion list is used to perform a search of the information set by excluding one or more categories based on one or more terms in a search query; and
wherein the change to the selection criteria results in a change to the category-term exclusion list.

5. The computer system of claim 3,
wherein the selection data is provided by inclusion data, wherein the inclusion data is provided from a synonym-term inclusion list, and wherein the synonym-term inclusion list is used to perform a search of the information set by including one or more synonyms of one or more terms in a search query; and
wherein the change to the selection criteria results in a change to the synonym-term inclusion list.

6. The computer system of claim 1, the operations further comprising:
receiving subsequent requests in the user interface to locate the items of the information set that were previously not retrieved, wherein the subsequent searches of the information set are provided via the user interface in response to the subsequent requests;
wherein the subsequent requests received in the user interface to locate the items include a textual search query or a category selection, to retrieve the items from the information set using the changes to the selection criteria.

7. The computer system of claim 1,
wherein the vicinity score is based on inputs received in the user interface, and wherein the vicinity score is identified from a respective set of streaming events which indicates a search and a commerce activity for a particular item; and
wherein the exposure score is based on outputs provided in the user interface, and wherein the exposure score is identified from the respective set of streaming events which indicates the amount of exposure for the particular item before the commerce activity.

8. The computer system of claim 1, the operations further comprising:
filtering the streaming events to identify navigation activities and purchase activities of a particular item of the information set, wherein the streaming events are further filtered based on relevancy of the navigation activities and purchase activities to inputs received within the user interface to locate and select the particular item.

9. The computer system of claim 1, the operations further comprising:
identifying a confidence level of changes to the selection criteria;
wherein changes to the selection criteria of a high confidence are automatically implemented;
wherein changes to the selection criteria of an intermediate confidence are presented to an administrator for approval and implementation; and
wherein changes to the selection criteria of a low confidence are not implemented.

10. The computer system of claim 1, wherein the user interface is a customer interface provided to an electronic commerce service, and wherein the user interface is provided from:
a software application operating on respective client computing devices, such that the streaming events are generated from navigation by respective users within the software application; or
a website hosted by a server computing device, such that the streaming events are generated from navigation in a web browser conducted by respective users with the website.

11. A method, comprising a plurality of electronic operations executed with processor circuitry of a computing device, the plurality of electronic operations comprising:
obtaining a plurality of streaming events representing user interaction in a user interface, wherein the streaming events indicate inputs received within the user interface to locate and select items from an information set;
identifying, from the streaming events, a plurality of search recall scenarios using a vicinity score and an exposure score for individual items of the information set, wherein the search recall scenarios result in respective commerce activities with the items of the information set, wherein the vicinity score relates to a proximity of a commerce activity to an attempted search for an individual item, wherein the exposure score relates to an amount of exposure of the individual item in the user interface before the commerce activity, and wherein the search recall scenarios occur when the items of the information set are not retrieved by attempted searches that utilize respective search terms in an attempt to locate the items;
determining, based on the identified search recall scenarios, a change to a selection criteria used to locate the items with subsequent searches of the information set that utilize the respective search terms; and
updating, based on the change to the selection criteria, a data set to include the change to the selection criteria, wherein the subsequent searches of the information set are configured to locate the items of the information set using the changed selection criteria.

12. The method of claim 11, the plurality of electronic operations further comprising:

wherein the selection criteria relates to a rule used to select a particular product from the information set, based on product information associated with a respective product item of the information set; and wherein determining the change to the selection criteria is performed based on an evaluation of one or more external signals and one or more product data fields associated with the respective product item.

13. The method of claim 11, wherein the selection criteria relates to selection data provided from one or both of exclusion data or inclusion data, and wherein the selection data is used within a search to retrieve matching items from the information set.

14. The method of claim 13, wherein the selection data is provided by exclusion data, wherein the exclusion data is provided from a category-term exclusion list, and wherein the category-term exclusion list is used to perform a search of the information set by excluding one or more categories based on one or more terms in a search query; and wherein the change to the selection criteria results in a change to the category-term exclusion list.

15. The method of claim 13, wherein the selection data is provided by inclusion data, wherein the inclusion data is provided from a synonym-term inclusion list, and wherein the synonym-term inclusion list is used to perform a search of the information set by including one or more synonyms of one or more terms in a search query; and wherein the change to the selection criteria results in a change to the synonym-term inclusion list.

16. The method of claim 11, the plurality of electronic operations further comprising:

receiving subsequent requests in the user interface to locate the items of the information set that were previously not retrieved, wherein the subsequent searches of the information set are provided via the user interface in response to the subsequent requests;

wherein the subsequent requests received in the user interface to locate the items include a textual search query or a category selection, to retrieve the items from the information set using the changes to the selection criteria.

17. The method of claim 11, wherein the vicinity score is based on inputs received in the user interface, and wherein the vicinity score is identified from a respective set of streaming events which indicates a search and a commerce activity for a particular item; and wherein the exposure score is based on outputs provided in the user interface, and wherein the exposure score is identified from the respective set of streaming events which indicates the amount of exposure for the particular item before the commerce activity.

18. The method of claim 11, the plurality of electronic operations further comprising:

filtering the streaming events to identify navigation activities and purchase activities of a particular item of the information set, wherein the streaming events are further filtered based on relevancy of the navigation activities and purchase activities to inputs received within the user interface to locate and select the particular item.

19. The method of claim 11, the plurality of electronic operations further comprising:

identifying a confidence level of changes to the selection criteria;

wherein changes to the selection criteria of a high confidence are automatically implemented;

wherein changes to the selection criteria of an intermediate confidence are presented to an administrator for approval and implementation; and wherein changes to the selection criteria of a low confidence are not implemented.

20. The method of claim 11, wherein the user interface is a customer interface provided to an electronic commerce service, and wherein the user interface is provided from:

a software application operating on respective client computing devices, such that the streaming events are generated from navigation by respective users within the software application; or a website hosted by a server computing device, such that the streaming events are generated from navigation in a web browser conducted by respective users with the website.

21. A non-transitory computer-readable storage medium, the computer-readable storage medium including instructions that, when executed by processor circuitry of a computing device, causes the processor circuitry to perform operations comprising:

obtaining a plurality of streaming events representing user interaction in a user interface, wherein the streaming events indicate inputs received within the user interface to locate and select items from an information set;

identifying, from the streaming events, a plurality of search recall scenarios using a vicinity score and an exposure score for individual items of the information set, wherein the search recall scenarios result in respective commerce activities with the items of the information set, wherein the vicinity score relates to a proximity of a commerce activity to an attempted search for an individual item, wherein the exposure score relates to an amount of exposure of the individual item in the user interface before the commerce activity, and wherein the search recall scenarios occur when the items of the information set are not retrieved by attempted searches that utilize respective search terms in an attempt to locate the items;

determining, based on the identified search recall scenarios, a change to a selection criteria used to locate the items with subsequent searches of the information set that utilize the respective search terms; and updating, based on the change to the selection criteria, a data set to include the change to the selection criteria, wherein the subsequent searches of the information set are configured to locate the items of the information set using the selection criteria.

22. The computer-readable storage medium of claim 21, wherein the selection criteria relates to a rule used to select a particular product from the information set, based on product information associated with a respective item of the information set; and wherein determining the change to the selection criteria is performed based on an evaluation of one or more external signals and one or more product data fields associated with the respective item.

23. The computer-readable storage medium of claim 21, wherein the selection criteria relates to selection data provided from one or both of exclusion data or inclusion data, and wherein the selection data is used within a search to retrieve matching items from the information set;

wherein the selection data is provided by:

exclusion data, wherein the exclusion data is provided from a category-term exclusion list, and wherein the category-term exclusion list is used to perform a search of the information set by excluding one or more categories based on one or more terms in a search query, and wherein the change to the selection criteria results in a change to the category-term exclusion list; or inclusion data, wherein the inclusion data is provided from a synonym-term inclusion list, and wherein the synonym-term inclusion list is used to perform a search of the information set by including one or more synonyms of one or more terms in a search query, and wherein the change to the selection criteria results in a change to the synonym-term inclusion list.

24. The computer-readable storage medium of claim 21, wherein the user interface is a customer interface provided to an electronic commerce service, and wherein the vicinity score is based on inputs received in the user interface, and wherein the vicinity score is identified from a respective set of streaming events which indicates a search and a commerce activity for a particular item;

wherein the exposure score is based on outputs provided in the user interface, and wherein the exposure score is identified from the respective set of streaming events which indicates the amount of exposure for the particular item before the commerce activity.

25. The computer-readable storage medium of claim 21, the operations further comprising:

filtering the streaming events to identify navigation activities and purchase activities of a particular item of the information set, wherein the streaming events are further filtered based on relevancy of the navigation activities and purchase activities to inputs received within the user interface to locate and select the particular item.

\* \* \* \* \*